May 23, 1950     O. A. GRAY     2,508,757
AUTOMOBILE SUN PROTECTOR
Filed April 7, 1947
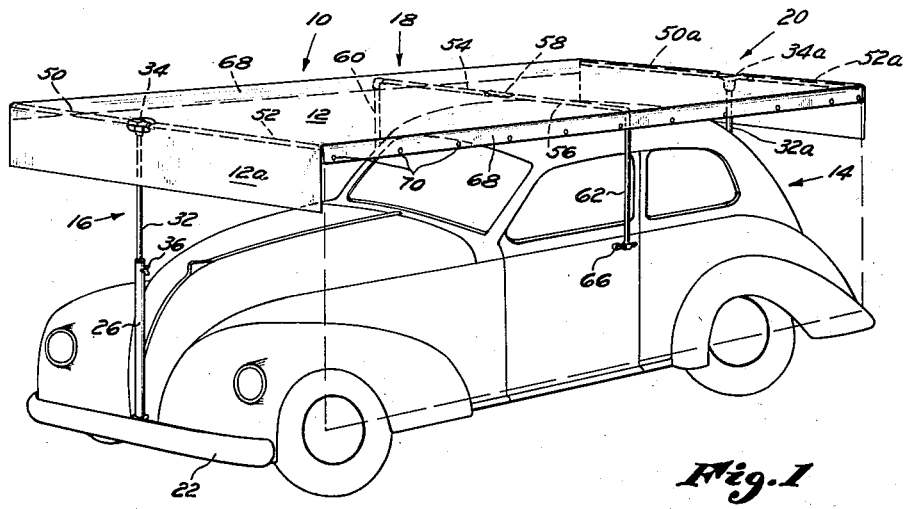
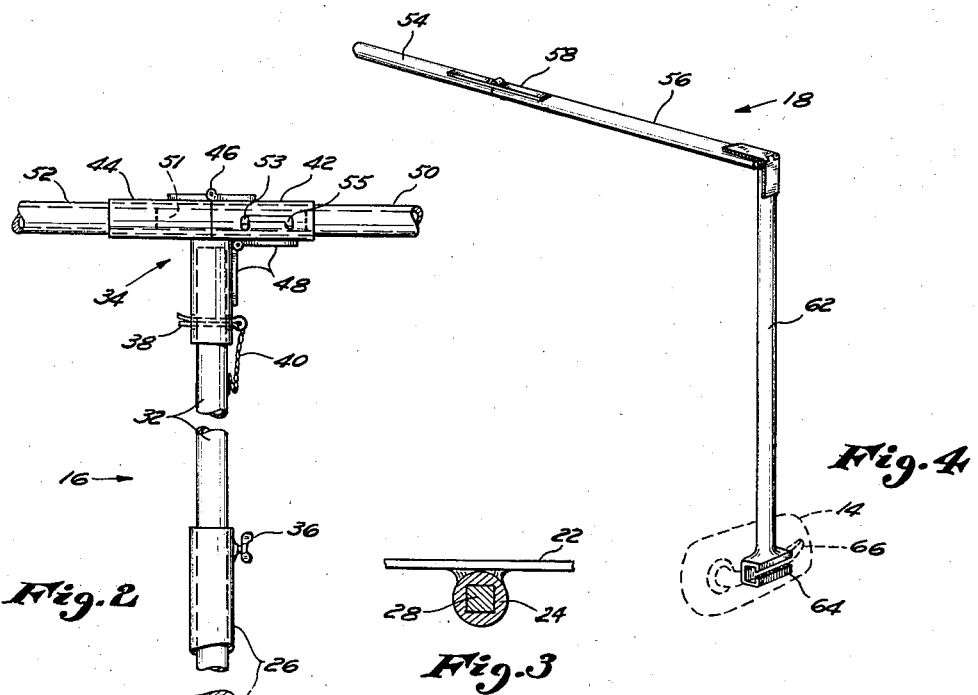
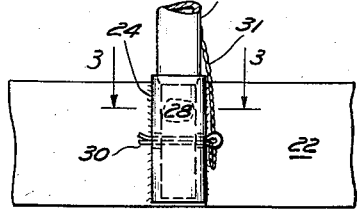
INVENTOR.
OLIVE A. GRAY
BY Stuart M. Maule
ATTORNEY Patented May 23, 1950

2,508,757

UNITED STATES PATENT OFFICE 2,508,757

AUTOMOBILE SUN PROTECTOR

Olive A. Gray, Santa Monica, Calif.

Application April 7, 1947, Serial No. 739,781

4 Claims. (Cl. 135—5)

This invention relates to a collapsible and detachable protective covering for an automobile or other vehicle.

More specifically, my attachment may be employed as a sun shade for a car so that prolonged exposure to the sun's rays will not promote such active deterioration of the external paint on the auto body as heretofore.

It is an important object to provide such a shade mounted on a series of separate transverse frames detachably secured to an automobile.

An important advantage of my invention resides in a construction of the supporting frames whereby the shade and frames may be jointly rolled into a small compact bundle for storage.

Another purpose is the provision of such an assembly, wherein the frames and shade can be quickly and easily attached to structures otherwise necessarily present on an automobile, such as the front and rear bumpers and the door handles.

Other objects and advantages of the invention will be apparent from the following description and claims, the novelty consisting in the features of construction, combination of parts, the unique relations of the members and the relative proportioning, disposition, and operation thereof, all as more completely outlined herein and particularly pointed out in the appended claims.

In the drawings, which form part of the present specification:

Figure 1 is a perspective view of an automobile upon which my sun shade is mounted.

Figure 2 is an enlarged detail view in end elevation, seen from the rear, of the front supporting frame.

Figure 3 is a detail view in horizontal section through the front frame and bumper, taken along the line 3—3 of Figure 2.

Figure 4 is a perspective view of a portion of the central, transverse, shade-supporting frame.

My vehicle sun protector, designated generally at 10, is formed of a sheet 12 of flexible substantially opaque material such as canvas which is suspended over the auto body 14 in a generally rectangular shape by a series of transverse frames 16, 18, and 20.

The forward frame 16 is here mounted on the front bumper 22 of the car, there being an upwardly opening socket member 24 affixed to the inner face of the bumper at approximately the center thereof. A tubular upright 26 is provided with a solid terminal portion 28, non-circular in cross section, which is seated in the socket and locked in place as by a cotter pin 30 inserted through aligned apertures in the socket member and in the upright. Conveniently, the cotter pin is attached to one end of a short chain 31 which is secured at its other end to the upright 26, so that upon withdrawal of the cotter pin and removal of the upright from the socket, the pin will be retained with the upright.

Slidably mounted in the upright 26 is a rod 32 bearing on its upper extremity a T-shaped bracket 34, the rod 32 being anchored at the desired elevation within the upright by a suitable locking screw 36. The vertical portion of the T-bracket 34 is hollow so as to receive therein the upper end of the rod 32, the two being fastened together by a second cotter pin 38 tied to the rod 32 as by a chain 40 similar to the fashion in which the lower pin 30 is secured against accidental loss.

The horizontal section of the T-bracket 34 is formed in two segments 42 and 44, each separate from the vertical part and having their common edge in axial alignment with the vertical portion. Segment 42 is hingedly attached to its opposite segment 44 by a hinge 46 located along the upper edge of the two, and is similarly connected to the upright portion by a hinge 48 secured to the lower surface of the segment 42. In this manner, the segment 44 can be folded over on segment 42, and the two segments by the hinge 48 then disposed parallel to the vertical portion of the T-bracket 34.

In the open end of each horizontal segment 42 and 44 of the T-bracket 34, there is inserted a longitudinal arm 50 and 52 respectively, which arms lie in a transverse hem defining the front edge of the flexible sheet 12 and from which in turn a short panel 12ᵃ of the shade material hangs down along the front of the car.

In order to lock the two horizontal segments 42 and 44 of the T-bracket in rigid position when their corresponding extension arms 50 and 52 are inserted therein, there is provided a cylindrical bolt 51 axially slidable within the two arms and having an outwardly extending pin or handle 53 disposed in an inverted U-shaped or bayonet slot 55 of the T segment 42. When the pin is moved to the end of the slot nearest the plane of abutment of the T segments, the forward end of the bolt extends into the farther extension arm 52, thereby preventing movement of the top hinge 46. When the pin is drawn back in the slot, the bolt is then housed entirely within the extension arm 50, thus permitting use of the hinge 46 to fold the two extension arms together.

Preferably, the rear frame 20 is constructed similarly to the front frame 16, comprising a rod 32a attached to the rear bumper by a socket (not shown) similar to the socket 24, and having an upper, medial T-bracket 34a carrying a pair of axially aligned, foldable, shade supporting arms 50a and 52a.

Intermediate the front and rear frames, the shade 12 is supported by the frame 18 which is composed of a pair of horizontal arms 54 and 56 joined together at their inboard ends by a hinge 58, and preferably also attached to the under surface of the flexible sheet 12 by being received within a transversely extending fold of the sheet stitched to define a tubular, looped portion similar to a hem except for the fact that it is formed in the intermediate portion of the sheet. The outer end of each arm is hingedly attached to a vertical rod 60 and 62, and the lower end of each rod 60, 62 is formed into a horizontal sleeve 64 in which to receive the adjacent handle 66 of the auto door.

Along each side edge 68 of the shade there is provided a horizontal row of snap fasteners 70, to which may be attached an additional side panel of shade material, as indicated in broken lines in Figure 1.

The described structure may be dismounted quickly and easily in accordance with the following procedure: both locking bolts 51 should be retracted and one of the sleeves 64, say the sleeve 64 carried by the rod 62, should be removed from its associated door handle 66. The entire proximal side of the sun shade can then be folded upwards and over onto the opposite side, folding the flexible sheet 12 lengthwise and letting the arms 52, 56, and 52a come to rest upon the arms 50, 54, and 50a, respectively.

The rod 62, which then extends vertically upwards, can be swung downwards into folding position closely adjacent the arm 56. The rods 32 and 32a can then be withdrawn from their respective upright supporting tubes 26, thus releasing the flexible sheet of shade material and the three supporting frames 16, 18, and 20 from the car. Owing to the hinged connection 48 between the rods 32 and 32a and the T-shaped brackets 34 and 34a, the rods 32 and 32a can then be folded into position closely adjacent and parallel to the rods 50 and 52, and the rods 50a and 52a, respectively. Therefore, the rods 32, 50, and 52 of the forward frame 16 will be arranged so compactly, as will also the rods 32a, 50a, and 52a of the after frame 18, as well as the rods 54, 56, 60, and 62 of the intermediate frame, that the entire shade, exclusive of the tubular upright 26, can be rolled into a compact bundle with the folded rigid frame members wrapped securely within the sheet of shade material so that the bundle, when stored within the car's luggage compartment, will be prevented from rattling. The tubular upright members 26 may be left in the bumper sockets 24 or removed therefrom if desired.

As will be understood readily, mounting the structure in operative position upon the automobile is accomplished by a procedure which is substantially the reverse of that described for its dismounting.

It is thus evident that I have produced a highly effective auto body protector which may be assembled and disassembled in a very short time and which requires only two mounting fixtures not already on the car, namely the front and rear bumper sockets (24). If more than the top sun shade 12 is desired, the triple frames can as well support side panels of similar material around the four sides of the car so as to provide complete protection of the vehicle from dust, rain, spray or vapors. Thus, such a protective shade may be used over a freshly painted auto to allow it to dry, out of reach of dust currents. Likewise, near the sea coast, cars may be stored in such protective envelopes to protect them from salt air.

While I have shown and described in some detail a presently preferred embodiment of my auto sun protector, it is to be understood that various modifications may be made in the construction and operation thereof within the scope of the subsequently claimed invention which is to be construed broadly and limited only by the prior art.

I claim:

1. An automobile sun protector comprising: a pair of socket members attached to the front and rear bumpers, respectively, of said automobile; a tubular upright disposed in each of said sockets; a rod slidably mounted in each of said tubular uprights; a T-shaped bracket secured to the upper end of each of said rods, the horizontal portion of said T-shaped bracket being diametrically split above the vertical portion, said split portions being hingedly connected to each other and one of the split portions being hingedly secured to the vertical portion whereby all three segments of the T-bracket may be collapsed parallel to each other in a vertical plane; a supporting arm inserted in each horizontal segment of each of said T-braces; and a shade attached to the several of said supporting arms so as to be suspended above the automobile.

2. The sun protector of claim 1 which additionally contains a collapsible frame attached to said shade intermediate said supporting arms, said frame being formed by a pair of horizontal arms adapted to lie across the top of said automobile, which arms are hingedly connected to each other at their proximal ends, and a vertical rod hingedly attached to the outer end of each horizontal arm and having engaging means on its lower end adapted to secure the rod to a door handle of the automobile.

3. The sun protector of claim 1 which additionally contains locking means on each of said T-braces to secure the horizontal arms thereof in outstretched position.

4. A sun protector for an automobile having front and rear bumpers and door handles spaced outwardly from the sides of said automobile and extending horizontally in a substantially fore and aft direction, comprising a flexible shade, a frame associated with each end of said shade, means for releasably mounting said frames upon the front and rear bumpers, respectively, of said automobile, and means for supporting said shade intermediate its ends comprising a transversely extending bar, a rod extending downwards from each end of said bar, and a tubular sleeve rigid with and disposed with its axis substantially perpendicular to the lower end of each of said rods, each of said sleeves being open at at least one end thereof to receive one of said door handles therein and being of substantial length whereby the associated rod is supported by said handle and is restrained thereby from falling either forwards or backwards with respect to said automobile.

OLIVE A. GRAY.

REFERENCES CITED

The following references are of record in the file of this patent:

UNITED STATES PATENTS

| Number | Name | Date |
| --- | --- | --- |
| 1,527,908 | Noble | Feb. 24, 1925 |
| 1,538,064 | Skog | May 19, 1925 |
| 1,784,115 | Sebell | Dec. 9, 1930 |
| 1,836,060 | Barnes | Dec. 15, 1931 |